INVENTOR.
HILARY A. RAAB
BY Charles S. Penfold
ATTORNEY

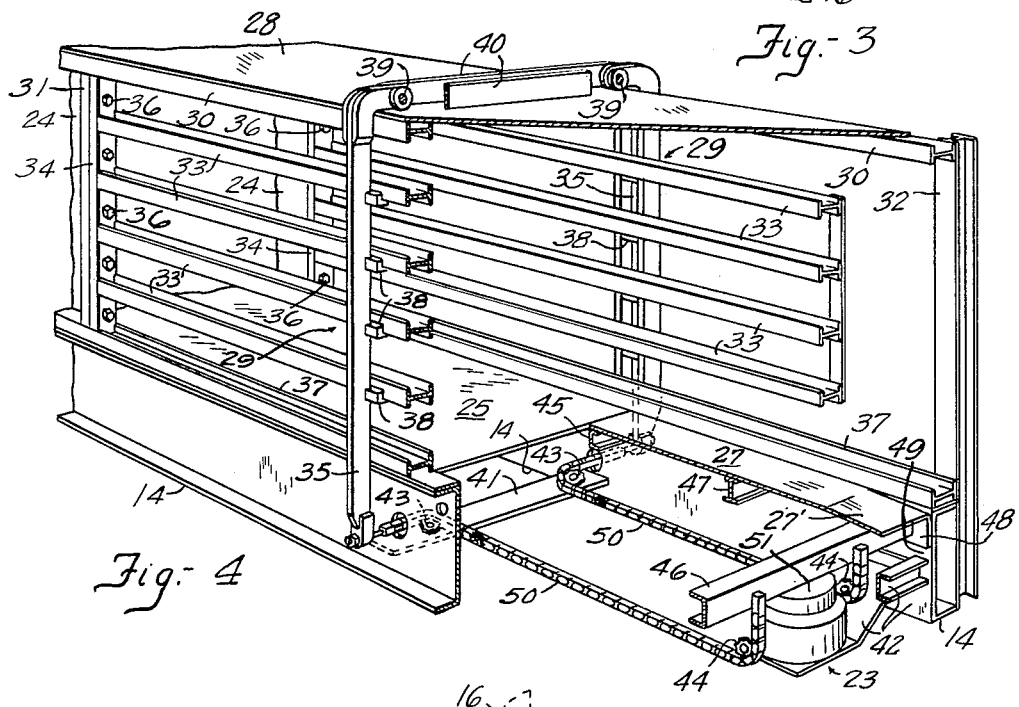

United States Patent Office

3,212,428
Patented Oct. 19, 1965

3,212,428
BALING STRUCTURE AND VENTING
MEANS THEREFOR
Hilary A. Raab, Hammond, Ind., assignor to East Chicago
Machine Tool Corporation, East Chicago, Ind., a corporation of Indiana
Original application Apr. 21, 1960, Ser. No. 23,848.
Divided and this application Aug. 23, 1963, Ser. No.
304,157
10 Claims. (Cl. 100—7)

The subject application is a division of my copending application Serial No. 23,848 filed April 21, 1960, now abandoned.

The subject invention relates generally to baling equipment and more particularly is directed to an apparatus or system comprising a plurality of assemblies or units which are operatively associated in a unique manner whereby to automatically form bales of uniform size and maximum density.

The equipment embodying the invention is preferably employed to bale material such as scrap paper, including, for example, box and corrugated board, newspapers, magazines, books, and the like, but may be utilized to bale any other suitable material or product.

More particularly, an object of the invention is to provide a system which, among other things, preferably comprises one or more material handling units, a baler, a collector or cyclone separator communicatively connected to the baler, suitable conduits or ducts connecting the units with the collector, exhausters operatively associated with the units for conducting the material to the collector, and controls whereby the operation of the units are synchronized with respect to one another and the baler so they are responsive to one another to provide efficient flow of the material to the collector from which it falls toward the baler through a discharge chute. If desired, different material handling units may be embodied in the system and operatively connected to one or more balers as the system may be readily modified to meet different installation requirements. One of the units preferably employed, for example, includes a pinch table feed conveyor for compressing large voluminous scrap material and force feed it to a hogger or macerator operatively associated therewith, which hogs and/or macerates the material for conduction through the conduits to the collector by an exhauster of such units. Also, one of the units may include a hooded casing or receiver which is adapted to receive scrap or waste material of a size smaller than which is introduced to the pinch table feed conveyor. The hooded casing is provided with an exhauster having mechanism for cutting and/or shredding the material fed thereto and a valve which controls the entry or flow of the material through the casing.

A signficant objective of the invention is to provide a unique system of electrical controls which may be interconnected in various combinations to achieve the results desired. More specifically in this regard, the electrical hookup is preferably such that, for example, an electric eye on the discharge chute connecting the collector and baler can be utilized to lock-out or prevent operation of the material handling units above referred so, so that material in excess of the capacity of the baler cannot be fed thereto. In other words, the discharge chute serves as a surge bin and the electric eye shuts off the flow of more material to the collector. Suitable signals are also included in the electrical hookup to indicate one or more conditions existing in the system. The motors employed in the system are all interlocked so that a control circuit must be activated at the baler.

Also, an object of the invention is to provide a baler in which the mass compacted by each stroke of the ram is automatically held in place against the previous compacted charge of material and each succeeding charge is held at a predetermined location to form a partition which resiliently engages wall structure of the baler chamber or an internal peripheral surface to temporarily seal off that part of the chamber which initially receives the material to prevent the escape of the material as it flows into the chamber.

A further object is to provide a baler with an opening which is communicatively connected to the discharge chute and the baling chamber so that when a charge of material is received from the overhead discharge chute, air will be forced outwardly through this opening. A removable filter may be placed across the opening to prevent the escape of small particles of the material from the chamber.

Another object of the invention is to provide a novel filter assembly which is communicatively connected to the discharge chute and the baling chamber to permit the escape of entrapped air to the atmosphere while retaining the dust in the chamber. The location of this filter assembly is significant as it promotes de-aeration of the flocculent mass of material in the baling chamber and particularly in the discharge chute.

Other objects reside in providing a system, machine or apparatus which offers advantages with respect to manufracture and assembly, installation, efficiency, durability, safety and low cost of maintenance.

Many other objects and advantages of the invention will become apparent after the description hereinafter set forth is considered in conjunction with the drawings annexed hereto.

In the drawings:

FIGURE 2 is an elevational view of the baler structure, with portions in section, including a tied bale and one in the process of being formed;

FIGURE 3 is a partial vertical section of a filter assembly which is operatively associated with the discharge chute and baling chamber;

FIGURE 4 is an enlarged perspective view of part of the baler structure exemplifying certain details thereof; and FIGURE 5 is a partial vertical section showing the manner in which a portion of a bale being formed constitutes a temporary partition which seals off a part of the baling or receiving chamber and the bale chamber.

Figure 1:
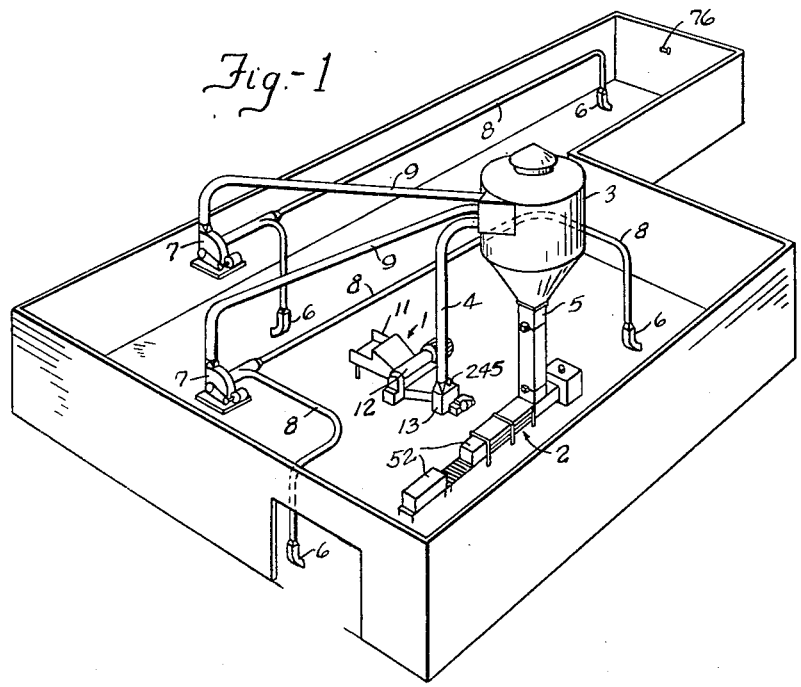
FIGURE 1 is a schematic or perspective view illustrating the general operative relationship of the units comprising the system.

The system embodying the subject invention may be designed and constructed in various ways but as exemplified in FIGURE 1 of the drawings it includes, among other things, a material preparation and receiving unit generally designated 1, a baler 2, a collector or cyclone separator 3, a conduit or duct 4 communicatively connecting the unit with the collector, and a discharge or feed chute 5 connecting the collector with the baler. The system may include one or more additional material receiving and conveying units, each of which may comprise a receiver 6 connected to an exhauster 7 by a conduit 8 and the exhauster to the collector by a conduit or pipe 9. Otherwise expressed, one or more receiving units 6 connected to the collector through a conduit may be referred to as a sub-system.

The material preparation unit 1 preferably includes a pinch table feed conveyor 11, a hogger 12, and an exhauster 13. The pinch table feed conveyor compacts and advances large bulky material for feeding to the hogger at restrained speed and quantity. The hogger breaks up and macerates the material into sizes that can be efficiently conveyed to the exhauster 13 and this exhauster including the exhausters 7 serve to cut or otherwise further condition the material for transmittal to the collector. The collector receives all conveying air and the material conducted thereby and the baler which constitutes the terminus of the transported material compacts the prepared material as received into bales of uniform density. The discharge or feed chute 5 directs the flow of the material from the collector to the baler and absorbs the surges between the baler capacity and excess material delivery.

The baler 2 may be designed and constructed in various ways but as exemplified in FIGURES 2 through 5, it is made elongate and constructed from relatively strong and heavy material to provide, among other things, a base 14 and suitable framework for supporting the operating components of the baler.

One extremity of the baler is preferably constructed to provide a housing 15 for means employed to operate or move a head 16 of a ram in one end of an elongate chamber to compact the material as it is introduced to the chamber from the chute 5 through an entrance opening 17. The chamber may be referred to as including a first or baling chamber 18 in which the ram head reciprocates to pack the received material and an elongate second or bale forming chamber 19 in which the mass of material is primarily formed or shaped into a bale. The head 16 is provided with pairs of horizontal slots or grooves 20 for receiving wires or equivalent means for use in tying the bales in conventional manner. The baler or machine is provided with suitable sensing controls located in the housing 15 for controlling the operating means for the ram means and with a cabinet 21 for additional controls, including a device generally designated 22 assisting to measure the length of the bale being formed, and an actuating or hydraulic unit designated 23, all of which are described in my copending application, Serial No. 339,068, filed January 13, 1964.

The first or baling chamber 18 is directly below the chute and is defined by a pair of opposed imperforate stationary walls 24, a bottom imperforate wall 25, the ram head and the inner end of a mass of material 26 being compressed. The forming or second chamber constitutes a continuation of the chamber 18 so that this material is compacted and moved longitudinally through the chambers.

The forming or baling chamber is elongate and preferably includes a stationary bottom wall constituting a continuation of the bottom wall 25 of the chamber 18, a wall or tiltable platform 27 pivotally mounted at its inner end to the frame, a stationary top or upper wall structure 28, and a pair of corresponding relatively movable side wall structures or units generally designated 29. The top wall 28 is supported on upper rails 30 carried by a plurality of pair of pillars including pairs 31 and 32. It will be observed that the top wall structure 28 extends forwardly and rearwardly of the opening 17.

Each of the side wall structures is fabricated and preferably includes a plurality of four elongate horizontal resiliently flexible pressure elements or members 33 connected together in parallel relationship by a vertical end member 34 and a depending arm 35. The end members 34 are preferably anchored to the pillars 31 by bolts 36 or equivalent means and the upper ends of these members may be nested in the upper rails 30 of the frame and in a pair of lower rails 37 in order to lend stability to the structures. The pressure elements can be attached to the arm or lever 35 by any suitable means but as shown the elements are connected to rests or abutments 38 carried by the arm. These abutments are preferably in the form of yokes which distribute the pressure to the elements at spaced locations. The upper extremities of the arms are preferably inturned and respectively pivotally connected at 39 to the ends of cross-bars 40 fixed on the top wall 28 in a manner whereby each of the wall structures can be moved relatively toward or away from one another and/ or flexed to apply radial pressure to the mass of material as it is being formed and moved in the chamber. The arms should normally be located no more than two-thirds of a bale length from the end of the ram stroke. This radial pressure may be varied to regulate the amount of frictional resistance derived between the mass and the side wall structures. These factors are important and as will be described more in detail subsequently, they assist in providing bales of uniform density.

As best illustrated in FIGURE 4, the baler is provided with a pair of braces 41 below the inner extremity of the tiltable platform or wall 27 and a supporting structure 42 below its free extremity or end. A pair of sprockets 43 are mounted on the bracces 41 for movement in a horizontal plane and a pair of sprockets 44 are mounted on the supporting structure 42 for movement in vertical planes.

The tiltable platform 27 is reinforced by a pair of end members 45 and 46, an intermediate member 47 and side plates 48, the latter of which are slidable between a pair of guide surfaces 49 of the base 14. A pair of chains 50 have their inner ends adjustably secured to the lower ends of the arms 35 and their outer ends anchored to the end member 46 so that the chains operatively engage the sprockets in a manner whereby when a piston 51 of the unit 23 is reciprocated the platform 27 will be caused to be raised and lowered and the side wall structures 29 to move relative to one another. The adjustable connections between the chains 50 and the arms 35 affords means for adjusting the tension of the chains and varying the distance between the wall structures to obtain the preset radial pressure on widely dissimilar materials. The side wall structures are normally disposed in a converging relation and the platform inclined upwardly so that they apply radial pressure from three directions tending to constrain, within practicable limits, the forward movement of a formed bale 52 and the mass 26 being formed. The organization is preferably such that the radial pressures applied to the formed bale and mass will create frictional resistance to prevent the operating means from advancing the ram with enough force to compress the mass and move it forwardly along with the formed bale. When this occurs, the platform will be caused to tilt downwardly and the side wall structures outwardly to relieve such pressures. Provision is made for causing rapid short forward strokes of the ram after it advances to a predetermined pressure operating position in the chamber 18. With this unique organization a resultant constant baling pressure is maintained to produce bales of uniform compactness regardless of any variance in the density, frictional resistance and the weight of the material being compressed.

The bale locking device 54, above referred to, includes a spring pressed pivotal lever or latch 56 which is adapted to be pivoted upwardly by each charge of material as it is compressed forwardly by the ram and then springs back to a normal operative position to engage and hold the compacted mass in place as the ram is retracted. This mass is preferably held at a predetermined location with its rear portion disposed between the upright end members 34 of the side wall structures and adjacent portions of the walls 24, 25 and 28 in order to seal off the chamber 18 from the chamber 19. Otherwise expressed inner joined surfaces of these walls define an internal peripheral bearing area which is intimately engaged by the mass for sealing purposes. As the material travels down the chute, a certain amount of air is entrained in the chamber 18. When the ram advances, it valves off the chute and material collects above it and when reversed a void, the size of the ram head is left for the material to enter. The material falls as a column compressing the air in the void or chamber 18 and since the baler is substantially dust tight, the material falls slowly as the air is dissipated. In order to assist in this decompression, an assembly designated 57, as shown in FIGURES 2 and 3 is located for communicative connection with the chute 5 and the chamber 18. This assembly is provided with an aperture 58 through which the air can escape and a detachable dust filter 59 is disposed across the aperture which allows the material to fall freely, yet contain the dust. The top wall 28 of the baler is provided with a vent opening 60 through which the air can enter the filter assembly for venting. The top wall 28 is also provided with a depending flange 61 disposed in close relation to the upper surface of the ram head to wipe off material on the head into the chamber and assist in blocking off the escape of dust laden air therefrom. Attention is directed to the fact that the latch 56 projects through an aperture therefor in the top wall 28 and this aperture is a size to closely receive the latch and thereby substantially prevent the escape of dust from the chamber.

As alluded to above, the device 22 assists in automatically measuring the length of a bale being formed in order to eliminate the human error and other influences. This device is operatively connected to an automatic electrical counter and an electrical control circuit not illustrated.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A machine for compacting material, said machine comprising a first chamber defined by an upper wall structure, a pair of parallel imperforate side walls, and an imperforate bottom wall, said machine also having a second chamber constituting a continuation of said first chamber, said second chamber being defined by a continuation of said upper wall structure, side wall means constituting continuations of said side walls, a bottom wall constituting a forward continuation of said first-mentioned bottom wall, said upper wall structure and said side and bottom walls of said first chamber being respectively provided with inner surfaces which are joined to define an inner peripheral area of a predetermined axial length disposed adjacent said second chamber, holding means carried by said forward continuation of said upper wall structure, said upper wall structure of said first chamber being provided with an opening for the reception of material adapted to be compacted in this chamber, said machine also having a housing disposed rearwardly of said first chamber, said housing having an upper wall generally constituting a rear continuation of said upper wall structure, a ram for compacting material received in said first chamber through said opening and forcing it forwardly into said second chamber, said holding means being automatically operable for holding a rear portion of the compacted material in intimate engagement with said peripheral area of said first chamber when said ram is retracted, and said rear continuation of said housing being provided with a vent communicatively connected with said first chamber for venting the latter when the machine is in operation.

2. The machine defined in claim 1, including means depending from said rear continuation of said housing disposed in relation to an upper surface of said ram whereby to assist in directing air toward said vent.

3. A machine for compacting material, said machine comprising a first chamber defined by an upper wall structure, a pair of parallel imperforate side walls, and an imperforate bottom wall, said machine also having a second chamber constituting a continuation of said first chamber, said second chamber being defined by a forward continuation of said upper wall structure, side wall means constituting continuations of said side walls, a bottom wall constituting a continuation of said first-mentioned bottom wall, said upper wall structure and said side and bottom walls of said first chamber being respectively provided with inner surfaces which are joined to define an inner peripheral area of a predetermined axial length disposed adjacent said second chamber, holding means carried by said forward continuation of said upper wall structure, said upper wall structure of said first chamber being provided with an opening for the reception of material adapted to be compacted in this chamber, said machine also having a housing disposed rearwardly of said first chamber, said housing structure having an upper wall generally constituting a rear continuation of said upper wall structure, a ram for compacting material received in said first chamber through said opening and forcing it forwardly into said second chamber, said holding means being automatically operable for holding a rear portion of the compacted material in intimate engagement with said peripheral area of said first chamber when said ram is retracted, and a vent provided in said rear continuation of said housing communicatively connected with said first chamber in a manner whereby when the ram is retracted and material flows downwardly into said first chamber air will flow upwardly and outwardly through said vent.

4. The machine defined in claim 3, including means depending from said rear continuation of said housing disposed in relation to an upper surface of said ram whereby to assist in directing air in said first chamber toward said vent.

5. A machine for compacting material, said machine comprising a first chamber having an upper wall provided with an opening for receiving material to be compacted and a second chamber constituting a forward continuation of said first chamber, a vertical chute connected to said upper wall and communicating with said first chamber through said opening, said upper wall having a continuation extending rearwardly from said chute, means in combination with said continuation and said chute defining a casing, and said casing being provided with a vent for venting said first chamber.

6. The machine defined in claim 5, including means depending from said upper wall and below said casing whereby to assist in directing air in said first chamber toward said vent.

7. The machine defined in claim 5, including a wall depending from said upper wall below said casing, and a wiper carried by said depending wall for engaging an upper surface of a ram adapted for movement in said first chamber.

8. The machine defined in claim 5, in which said casing includes an inclined wall connecting said rearwardly extending continuation and said chute, and said vent is provided in said wall.

9. The machine defined in claim 5, including a screen adapted for detachable disposition over said vent.

10. A machine for compacting material, said machine comprising a first chamber having upper wall structure provided with an opening for receiving material to be compacted and a second chamber constituting a forward extension of said first chamber, a vertical chute connected to said upper wall structure and communicatively connected with said first chamber through said opening, said upper wall structure having continuations respectively extending forwardly and rearwardly from said chute, and a vent provided in said rearwardly extending continuation adjacent said chute for venting said first chamber.

References Cited by the Examiner
UNITED STATES PATENTS

| Re. 9,906 | 10/81 | Dederick | 100—91 |
|---|---|---|---|
| 263,372 | 8/82 | Wickey et al. | 100—91 |
| 313,960 | 3/85 | Sherman | 100—91 |
| 405,270 | 6/89 | Paty et al. | 100—191 XR |
| 1,100,592 | 6/14 | Madden. | |
| 1,494,007 | 5/24 | Murray | 100—76 XR |
| 1,830,623 | 11/31 | Rollman | 100—191 XR |
| 2,660,949 | 12/53 | Russell | 100—187 |
| 2,938,451 | 5/60 | Seltzer | 100—269 XR |

WALTER A. SCHEEL, *Primary Examiner.*